US009992176B2

(12) United States Patent
Anson

(10) Patent No.: US 9,992,176 B2
(45) Date of Patent: *Jun. 5, 2018

(54) SYSTEMS AND METHODS FOR ENCRYPTED COMMUNICATION IN A SECURE NETWORK

(71) Applicant: NOWWW.US Pty Ltd, Darlington (AU)

(72) Inventor: Mark Rodney Anson, Sydney (AU)

(73) Assignee: NOWWW.US PTY LTD., Darlington NSW (AU)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/697,758

(22) Filed: Sep. 7, 2017

(65) Prior Publication Data
US 2018/0013734 A1 Jan. 11, 2018

Related U.S. Application Data

(63) Continuation of application No. 15/385,715, filed on Dec. 20, 2016, now Pat. No. 9,794,235, which is a continuation of application No. 14/286,298, filed on May 23, 2014, now abandoned.

(30) Foreign Application Priority Data

May 23, 2013 (AU) ................................ 2013901852
Jun. 4, 2013 (AU) ................................ 2013902015
Aug. 2, 2013 (AU) ................................ 2013101046

(51) Int. Cl.
H04L 29/06 (2006.01)

(52) U.S. Cl.
CPC ...... *H04L 63/0442* (2013.01); *H04L 63/0435* (2013.01); *H04L 63/061* (2013.01); *H04L 63/123* (2013.01)

(58) Field of Classification Search
CPC ....... H04L 63/168; H04L 63/08; H04L 63/04; G07F 19/00; G06F 21/00
See application file for complete search history.

(56) References Cited

U.S. PATENT DOCUMENTS

| 7,861,075 B2* | 12/2010 | Brendel | H04L 63/04 709/223 |
| 8,752,146 B1* | 6/2014 | van Dijk | H04L 63/0861 340/5.52 |
| 8,885,823 B2* | 11/2014 | Poli | H04N 7/1675 380/211 |
| 2005/0278777 A1* | 12/2005 | Loza | H04L 63/102 726/4 |
| 2008/0095373 A1* | 4/2008 | Nagata | H04L 63/10 380/278 |
| 2010/0228973 A1* | 9/2010 | Dancer | H04L 63/0442 713/168 |
| 2013/0173915 A1* | 7/2013 | Haulund | H04L 9/3226 713/159 |

* cited by examiner

*Primary Examiner* — Wasika Nipa
(74) *Attorney, Agent, or Firm* — Rosenberg, Klein & Lee

(57) ABSTRACT

A method for users of devices including mobile phones and computers to engage in encrypted communications with other devices using asymmetrical key exchange technology, involving the user of a device first creating a password and then at a later time re-entering that password on the device, with the result that when the password is re-entered the device is able to decrypt a set of software components that are required for a fresh session of encrypted communications.

17 Claims, 16 Drawing Sheets

_SYSTEMS AND METHODS FOR ENCRYPTED COMMUNICATION IN A SECURE NETWORK_

CROSS REFERENCE TO RELATED APPLICATIONS

This application is a continuation of and claims priority to U.S. patent application Ser. No. 15/385,715, entitled "Systems and Methods for Encrypted Communication in a Secure Network," filed Dec. 20, 2016; which is a continuation of and claims priority to U.S. patent application Ser. No. 14/286,298, entitled "Process for Encrypted Login to a Secure Computer Network, for the Creation of a Session of Encrypted Communications Between Computers and a Device Including a Mobile Phone Logged into a Network, for the Persistence of Encrypted Communications between Communication Devices, and for the Termination of Communications," filed May 23, 2014.

Application Ser. No. 14/286,298 claims priority to Australian Patent Application No. 2013901852, entitled "A Process for Encrypted Login to a Secure Computer Network, for the Creation of a Session of Encrypted Communications Between Computers and a Device Including a Mobile Phone Logged into a Network, for the Persistence of Encrypted Communications between Communication Devices, and for the Termination of Communications," filed May 23, 2013; Australian Patent Application No. 2013902015, entitled "A Login Process for Mobile Phones, Tablets and Other Types of Touch Screen Devices or Computers," filed on Jun. 4, 2013; and Australian Patent Application No. 2013101046, entitled "A Process for Encrypted Login to a Secure Computer Network, for the Creation of a Session of Encrypted Communications Between Computers and a Device Including a Mobile Phone Logged into a Network, for the Persistence of Encrypted Communications between Communication Devices, and for the Termination of Communications," filed Aug. 2, 2013.

Each prior, related application recited above is hereby incorporated by reference as though fully set forth herein.

BACKGROUND OF THE INVENTION

Technical Field

The present invention pertains to the field of computer security and in particular to the field of establishing secure communication links between a portable communication device and a remote server.

Background Art

The field of computer security addresses a plurality of issues including, but not limited to, security of communication devices, security of servers that the devices access and security of the link between the servers and the devices.

SUMMARY OF THE INVENTION

Technical Problem

To solve, at least in part, the problem of establishing a secure link between a portable communication device and a remote server and in particular addressing the problem of 'man in the middle' attacks between the device and the server.

Technical Solution

Using a plurality of overlapping identifying indicia and processes including: a location identifier for the device, randomised passwords for the device requiring a plurality of re-entries to refresh sessions, a device identifier, a server identifier, a connection identifier, asymmetric key encryption (including the possibility of manual delivery of private keys and manual audits) so as to ensure that the link between the server and the device is as secure as possible.

Advantageous Effects

The prospect of corruption of the link between a communication device and a remote server by an unauthorized person is minimized.

In view of the above, in one aspect of the invention a method for securing a signal passing between a communication device and a server is provided, which includes a step of: including, on at least two occasions, a password associated with the communication device in the signal, where the signal has been encrypted using asymmetric key encryption.

In a related aspect the invention also provides a computer system further including a server; means for storing data used by the server; means for asymmetrically encrypting a signal that passes between the server and a communication device connected to the server; and means for authenticating the signal using a password that has been passed to the server from the communication device on at least two occasions.

In another related aspect the invention also provides a computer system further including means for determining location of a communication device connected to the system; wherein the system is secured using asymmetric key encryption.

In yet another related aspect the invention also provides a computer system further comprising means for randomizing the system's password entry display in such a way as to secure the system.

BRIEF DESCRIPTION OF THE DRAWINGS

FIG. 7 illustrates the use of a password, user name and device identifier to ensure, at least in part, that a communication is properly authenticated.

DETAILED DESCRIPTION OF THE PREFERRED EMBODIMENTS

The description in the body of the specification pertains to preferred modes of invention. Accordingly, features recited in the body should not be construed to be essential features of the invention unless explicitly indicated. Further, any reference in the body of the specification to the expression "invention" should be construed to imply a reference to preferred embodiments only.

Embodiments of the present invention relate to network communications of encrypted data. The process involves communication between servers and client devices, with asymmetrical key exchange cryptography used in communications between client devices and servers. A client device can be any terminal, tablet device, mobile phone or another type of computer that is configured to perform encrypted communications with servers in a secure network of the type described here. The secure network specified here can include servers that perform tasks including login authentication servers, database servers and communications management servers and other machines supporting the infrastructure of the secure network including load balancing servers, firewalls and routers.

Using the process described here a session of encrypted communications can proceed even if communications between the device and the secure network are passing through an insecure network such as the Internet.

Figure 1:
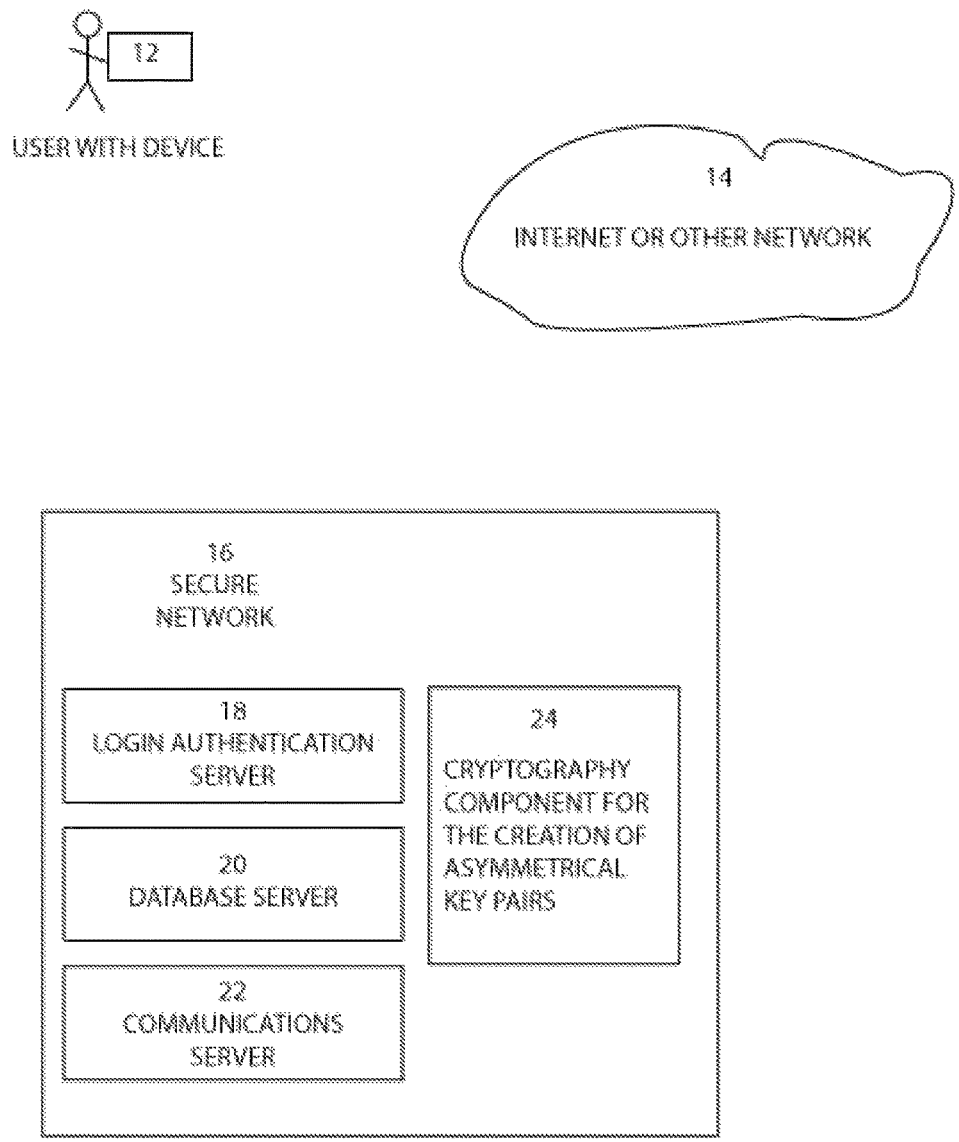
FIG. 1 broadly outlines the connective relationships between a portable communication device and a server across a secure network that has been secured according to embodiments of the present invention.

FIG. 1 shows a user with a device 12, a person using the system to communicate with other people or with networked computers that provide content to the user. A user 12 can communicate with a secure network 16 directly or via the internet or another network 14. The device of the user attempting to use this system can connect with a login authentication server 18 within the network and this server 22 can communicate with a database server 20 or servers in order to authenticate the user. If the user is authenticated the login authentication server can send a response to the device of the user 12 and this response message can contain data that can enable the device to receive and send data to a communications management server 22. Communications between the device of a user and the secure network can involve the use of asymmetrical key encryption. Communications between the client device of the user and the login authentication server 18 or the communications management server are encrypted with private and public keys, but communications between a login authentication server 18 and a communications management server 22 may not require encryption as those communications can proceed within a secure network secured by a firewall and other mechanisms. Nevertheless, for purposes of creation of asymmetrical key pairs a cryptography component 24 is provided.

Figure 2:
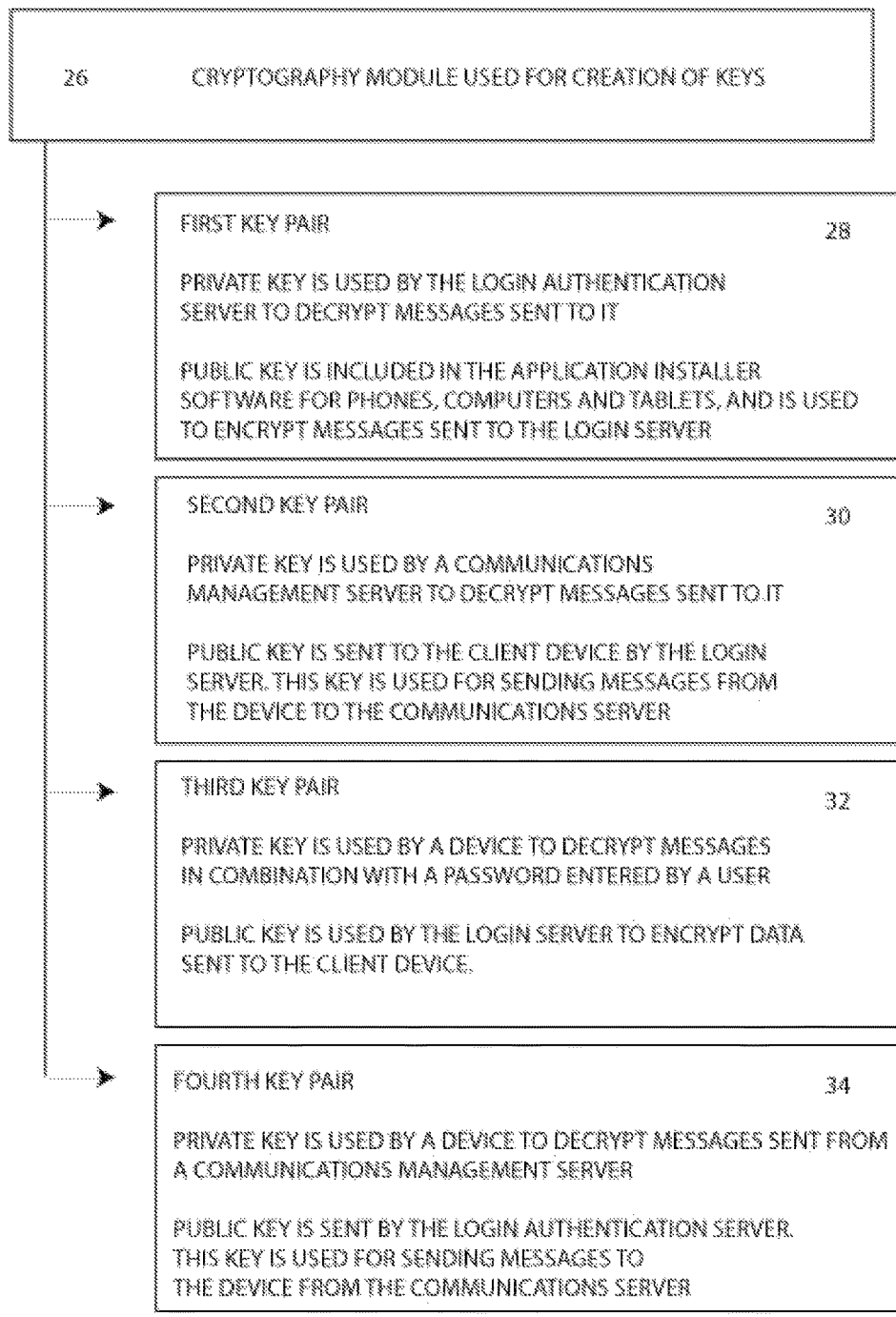
FIG. 2 goes into further detail about the cryptography component illustrated previously in FIG. 1 and in particular details the process of public and private key exchange across a secure a network.

FIG. 2 shows four key pairs used within this system to encrypt and decrypt data communicated between the client device of a user and servers within the secure network. Data is encrypted by means of a cryptography module 26 that creates key pairs and executes the encryption and decryption procedures. The cryptography module 26 can be stored as code on the login or communication server. Alternatively, those servers can engage other machines or computerised systems that contain the actual cryptography module 26 which exist within the secure network to execute the cryptography processes.

The first key pair 28 has a public key that a client device can use to encrypt messages being sent to the login authentication server. The private key is stored within the server and it is used by the login authentication server to decrypt messages it receives from devices. The public key is included in the application installer installed by smart phones, computers, tablets and similar devices (see FIG. 3).

The second key pair 30 has a private key that is used by a communications management server to decrypt messages sent to it by a client device, with the public key being sent by the login authentication server to the client device of a user in order for the client device to create encrypted messages.

The third key pair 32 has a private key that is used to decrypt messages within a client device, in combination with a password entered by a user and the device identifier value and, optionally, the session identifier. In the process of generating the third key pair the password and the device identifier values can be used as input parameters included in the key generation process, such that when the third key pair private key is used for the purposes of decrypting a message, the proper password and device identifier value must be provided in order for the decryption process to succeed. The public key of the third key pair is used by the login authentication server to encrypt data that is sent from the login server to the client device. The encrypted data sent to the client device includes such things as the IP address of a communications server.

The fourth key pair 34 has a private key that is used within a device to decrypt messages sent to the device by a communications management server. The public key is sent to the communications server by the login authentications server.

To enable users with different kinds of client devices to connect with servers providing encrypted network communications as described here, software can be developed and distributed through a variety of distribution channels.

Figure 3:
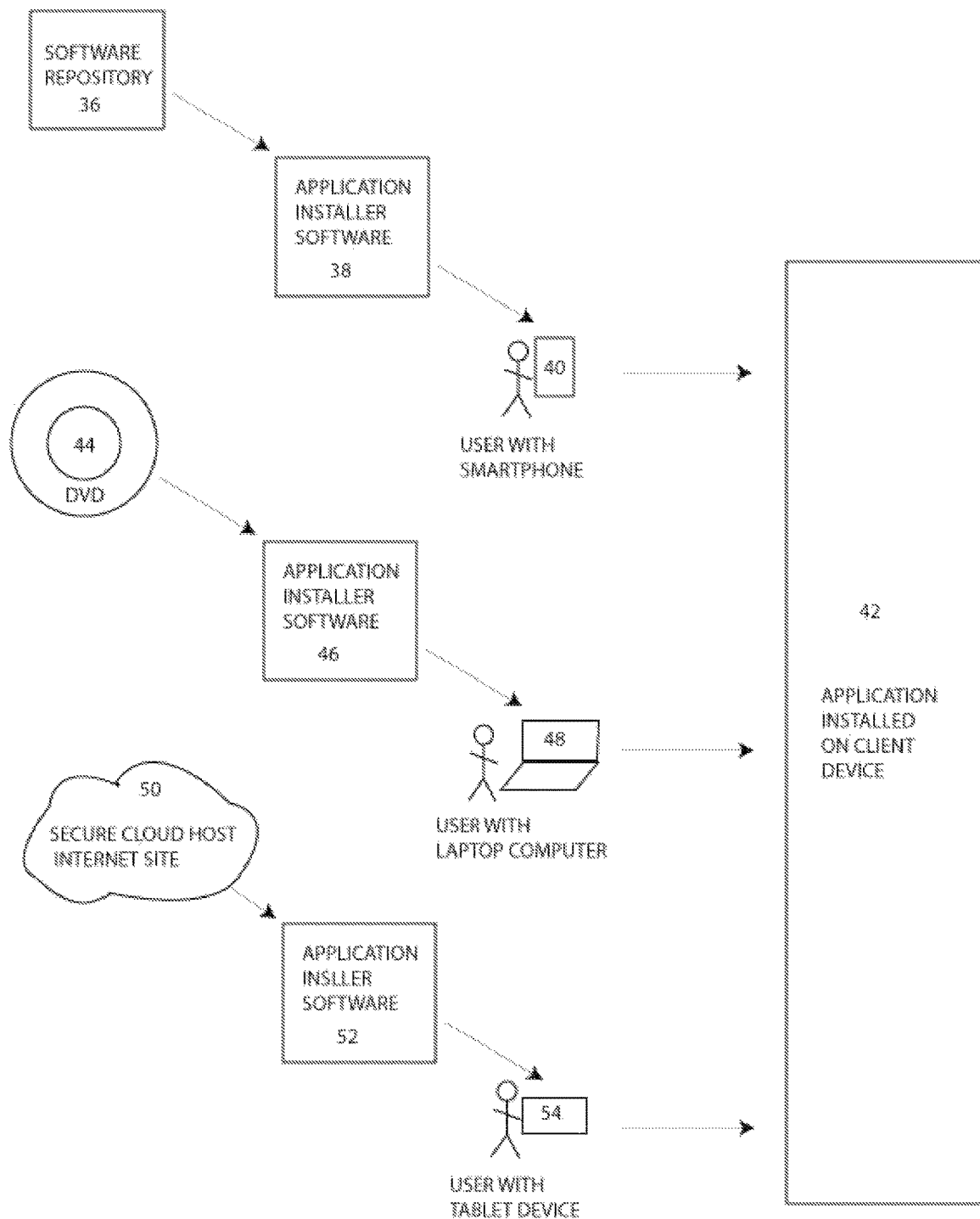
FIG. 3 details the installation of software used to implement preferred embodiments of the present invention on smartphones, laptop computers, and tablets.

In FIG. 3, a user with a smartphone 40 downloads application installer software 38 from an app store or software repository 36. A user with a laptop or desktop computer 48 downloads application installer software 46 from a DVD or CD ROM 44. A user with a tablet device (54) downloads application installer software 52 from a secure cloud hosting Internet site 50. Through these and similar commonly known procedures, software is installed on the client device of a user with the result that the installed software application 42 is set up and able to engage in secure communications with servers within a secure network. The client device can communicate with servers via a telecommunications network, the Internet or similar networks including intranets.

Figure 4:
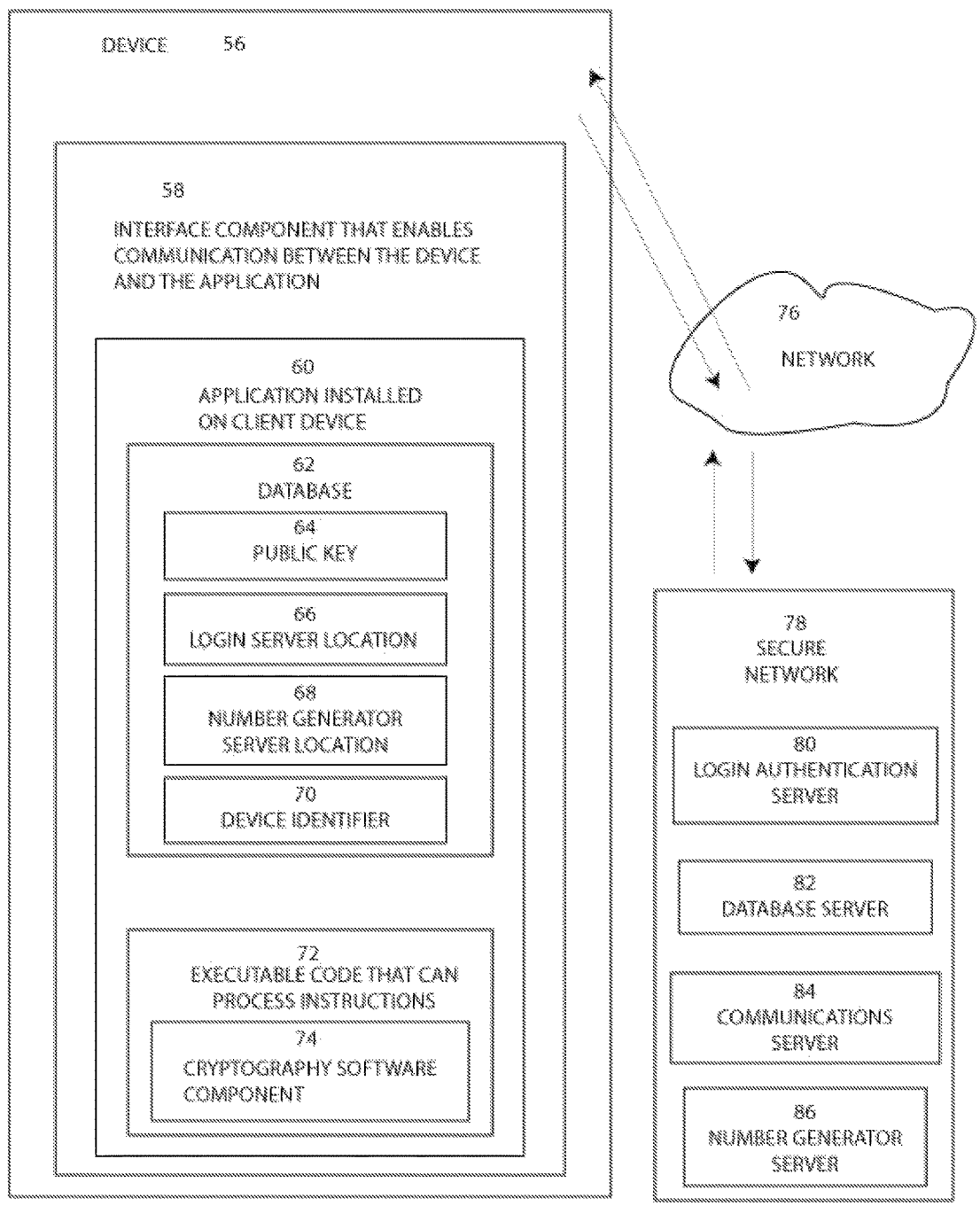
FIG. 4 illustrates various components of preferred embodiments of the present invention that are installed on a communication device and a server, including in particular identifiers including a device identifier, location identifiers, and cryptography applications.

In FIG. 4 the main components of the entire system are shown. The application installed on the device 60 is the same element of the system that is defined as item 42 in FIG. 3.

The application 60 contains a number of components. One component is executable code that can process instructions 72 including a cryptography software component 74. Another component is a database 62 that includes several items. One item within the database is the location 66 of a login authentication server 80 to which the application can connect. The location value 66 can be stored in the database within the client device in the form of an IP address, URL or another data format describing a network location. A second item in the database within the client device is a public key 64 of a first key pair. The private key associated with the public key 64 resides on a login authentication server 80. This first key pair's public key can be used to encrypt communications being sent to the server via a network 76.

The application 60 and the device 56 send and receive data from each other via an interface component 58.

When the application is first installed the application can create a new item of information in the database, a device identifier 70 value. In order to define this device identifier 70 value the application 60 can employ different procedures in the case of a mobile phone device or in the cases of a desktop computer or laptop. In the case of a mobile phone, the interface component 58 can get the IMEI number of the device or the IMSI number and pass this information to the application 60 and then either of those values can be used as the value of the device identifier value 70. In the installation process of the application 60 onto a desktop computer, a different method of identifying the device can be used. The application 60 can be configured to execute a process in which an instruction is sent via the interface component 58 to the device 56, and this instruction contains a request that the device should send a message via a connected network to a unique number generator server 86 in order to get a unique identifier value 70 for the device. The number generator server 86 responds to this request by sending back a large number or text string 70. This response text is passed to the application 60 by the device 56 via the interface component 58, and the application takes this value and creates a database record 70 in the database. The end result of these different procedures that can be performed for different types of devices is that the database gets updated with a unique device identifier 70 value that is used to signify the device. Further to the above the device also flags and stores, for purposes of security, the number generator server location 68.

Figure 5:
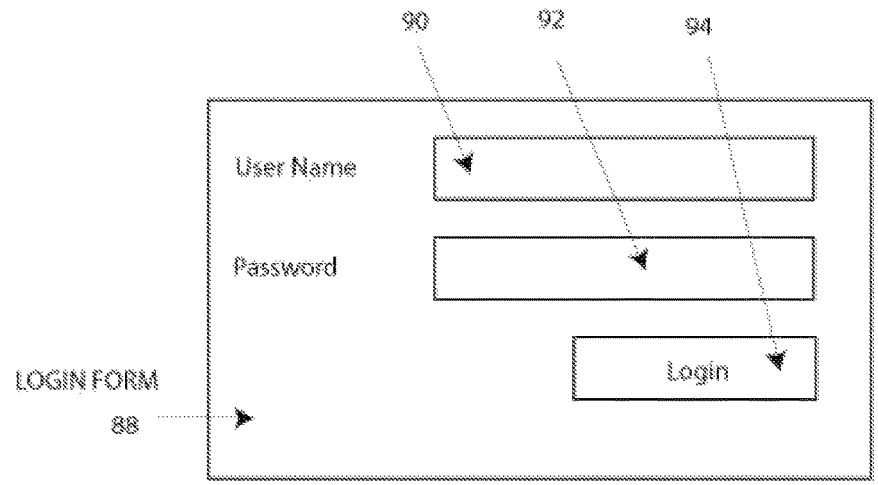
FIG. 5 illustrates the process of extracting data from a login form used on a portable communication device (including extraction from a user of a password, extraction from a device of the device's identifier) and associated encryption of the message. Data is extracted from the login form and stored in memory storage device 98.
Figure 5:
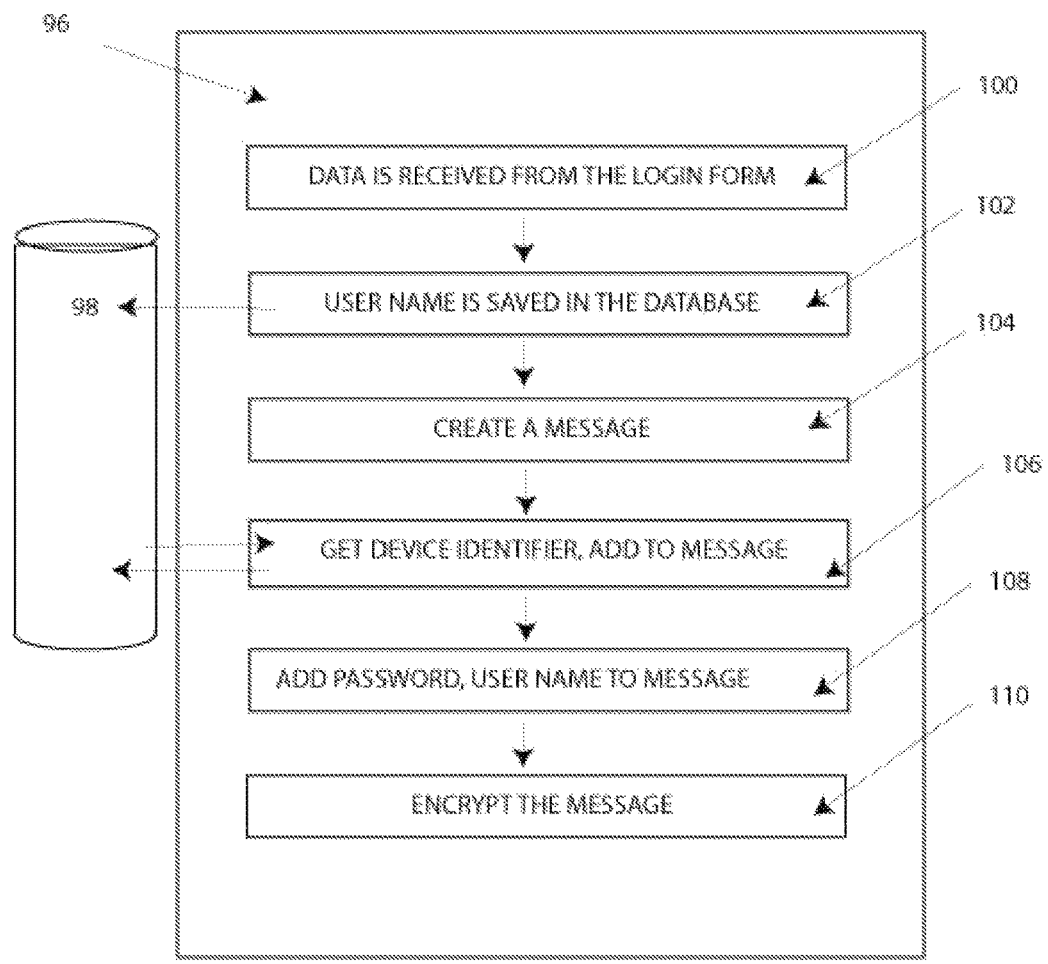
Figure 12:
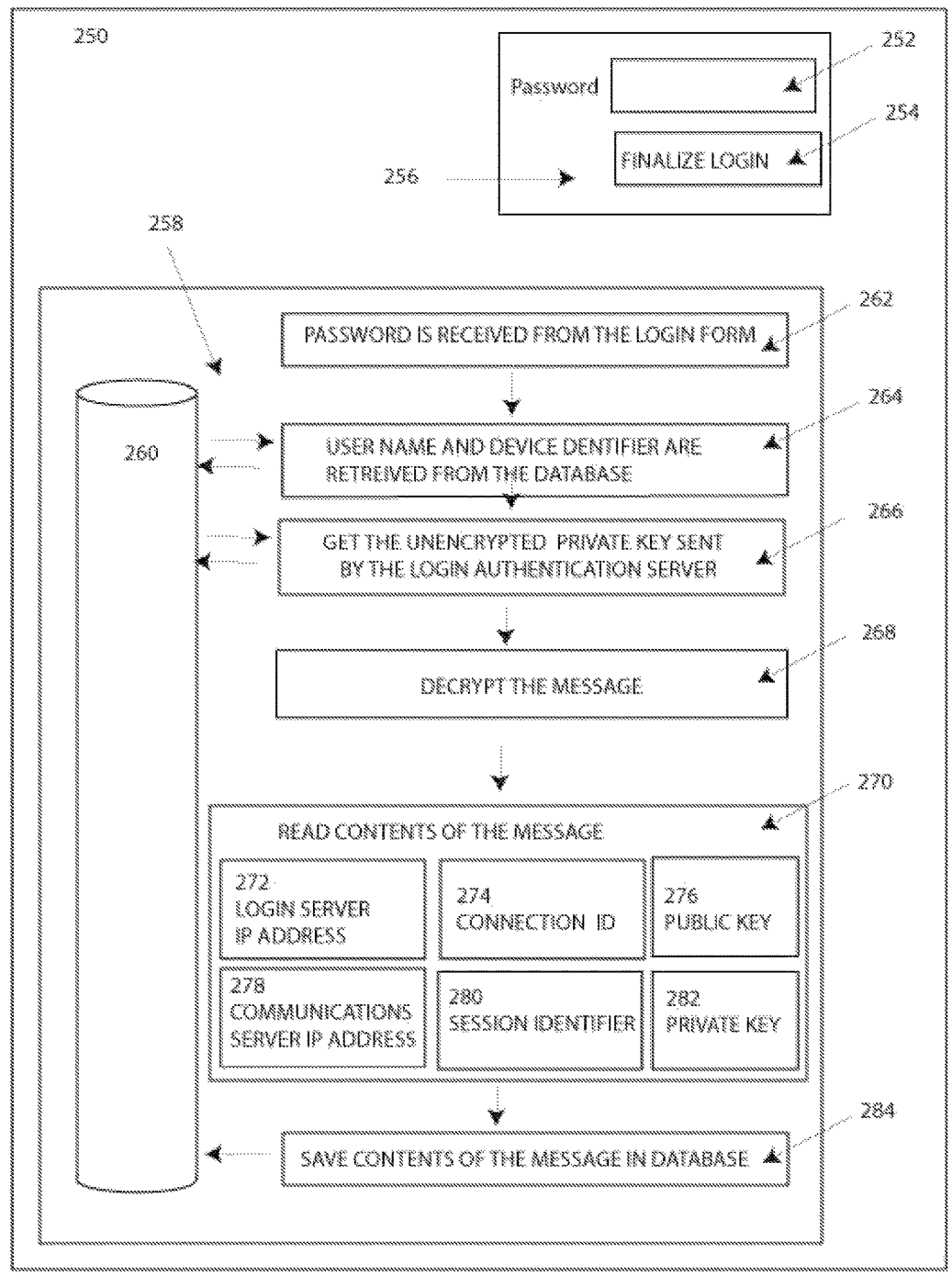
FIG. 12 discloses the final phase of logging in, pertaining to the downloading and reading of the encrypted and unencrypted messages sent from the login authentication device to the client device.

FIG. 5 shows the first step of the login process for a user that continues through a series of steps until the final step shown in FIG. 12.

In FIG. 5 it is shown that the application displays a screen on the graphical user interface of the client device enabling the user to interact with the application. The user initially sees a log in form 88 displayed on the screen of the device.

A user can be an individual who has been previously granted an access right to log in to a secure computer network. This authorised user can be given a password and a user name by the network administrator. The user enters the password 92 and a user name 90 or user account identifier in the login form displayed on the screen of the phone or computer device.

The user clicks or touches a button 94 labelled "Login", or words to that effect, and the application receives the data input entered by the user. That data received by the application is passed to the application by the interface component and the device.

The installed application contains software programs including software 96 that processes the login input data received from a user.

The software 96 takes the user name entered by a user and stores that data in a database or file 102. The password provided by a user is never saved on the device. The software 96 creates a message 104 and the password is added 108 to that message along with the user name.

Other details of information are also included within the message created by the installed application. Importantly, a process is executed 106 that gets the device identifier value from the database of the device and that identifier is added to the message.

The message is then encrypted 110 using the first key pair public key.

Figure 6:
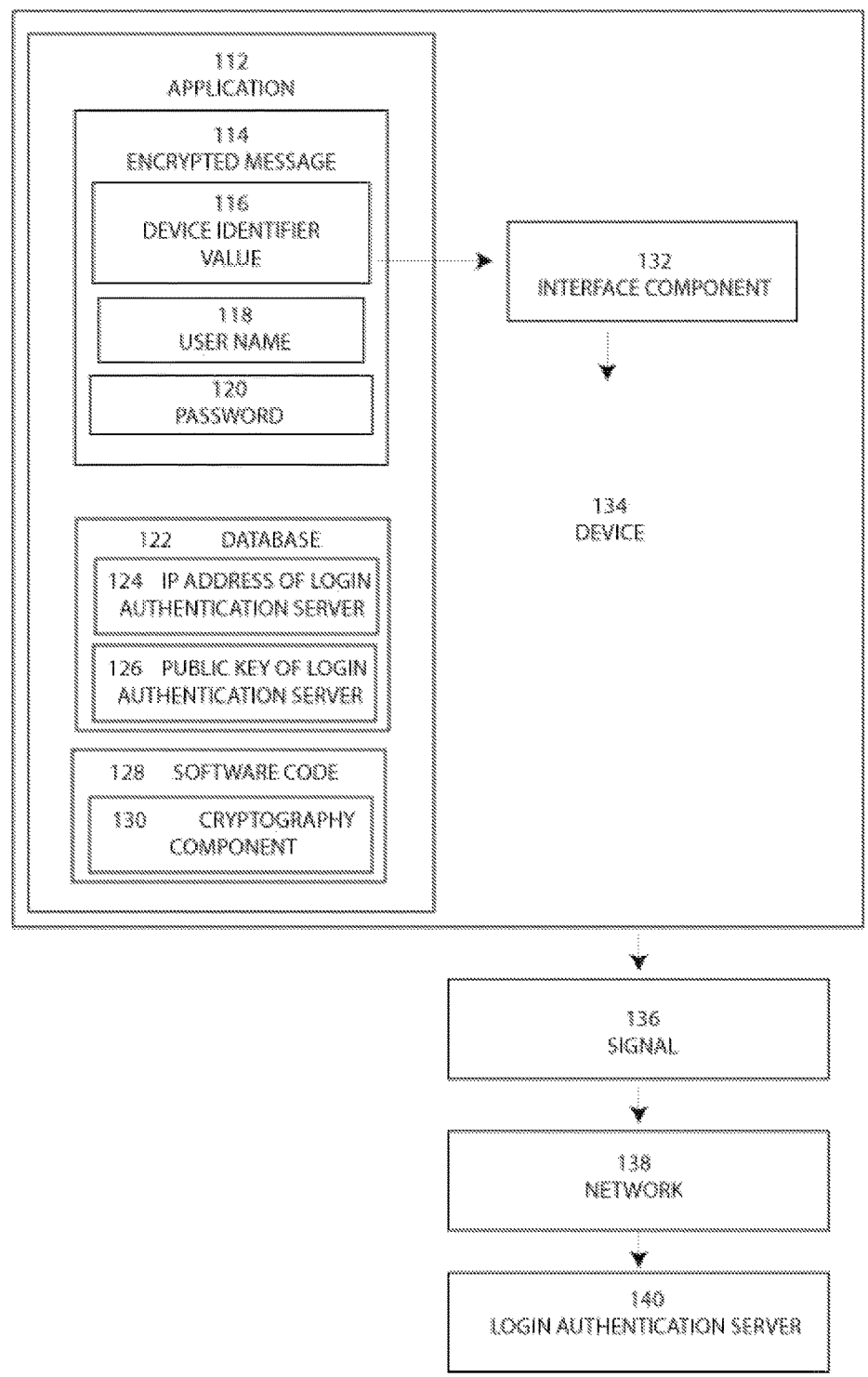
FIG. 6 shows further details pertaining to connecting to a remote server using a portable communication device and in particular the transmission of an encrypted message from the device to the server, where the message contains a plurality of indicia used to authenticate the request for access by the device including a device identifier, a user name and a password.

FIG. 6 shows the second part of the login process for a user. The installed application within a device sends the encrypted message to a login authentication server. The application within the device's database 122 can pass on to the device 134 the IP address of the login authentication server 124. This IP address value is stored within the database 122 of the application 112. The device receives the IP address 124 and the encrypted message 114 via the interface component 132. The device generates a signal 136 that is sent to the specified IP address of the login authentication server 140 via a network 138.

At the specified IP address of a login authentication server there can be a firewall configured to process data sent to that IP address. The firewall can connect with a load balancing server and other types of machines in a secure network. The various components of that secure network can work together so that the secure network as a whole is able to listen and receive data from devices, to process input received from client devices, and to execute appropriate actions in response to the input received from client devices. The computer network listening for signals can be configured to block invalid communications and to process only valid data.

A computer network of the type described here can receive a huge range of invalid communications from a range of sources, including communications from devices engaging in a distributed denial of service attack that attempts to harm the network. The firewall of the secure network can be properly configured to manage these sorts of problems in an appropriate way. The specific firewall and network security configuration measures that can be appropriate in response to different types of attack must be constantly evolving in response to continuously evolving modes of attack employed by hackers and intruders, so those matters will not be further described here.

Figure 7:
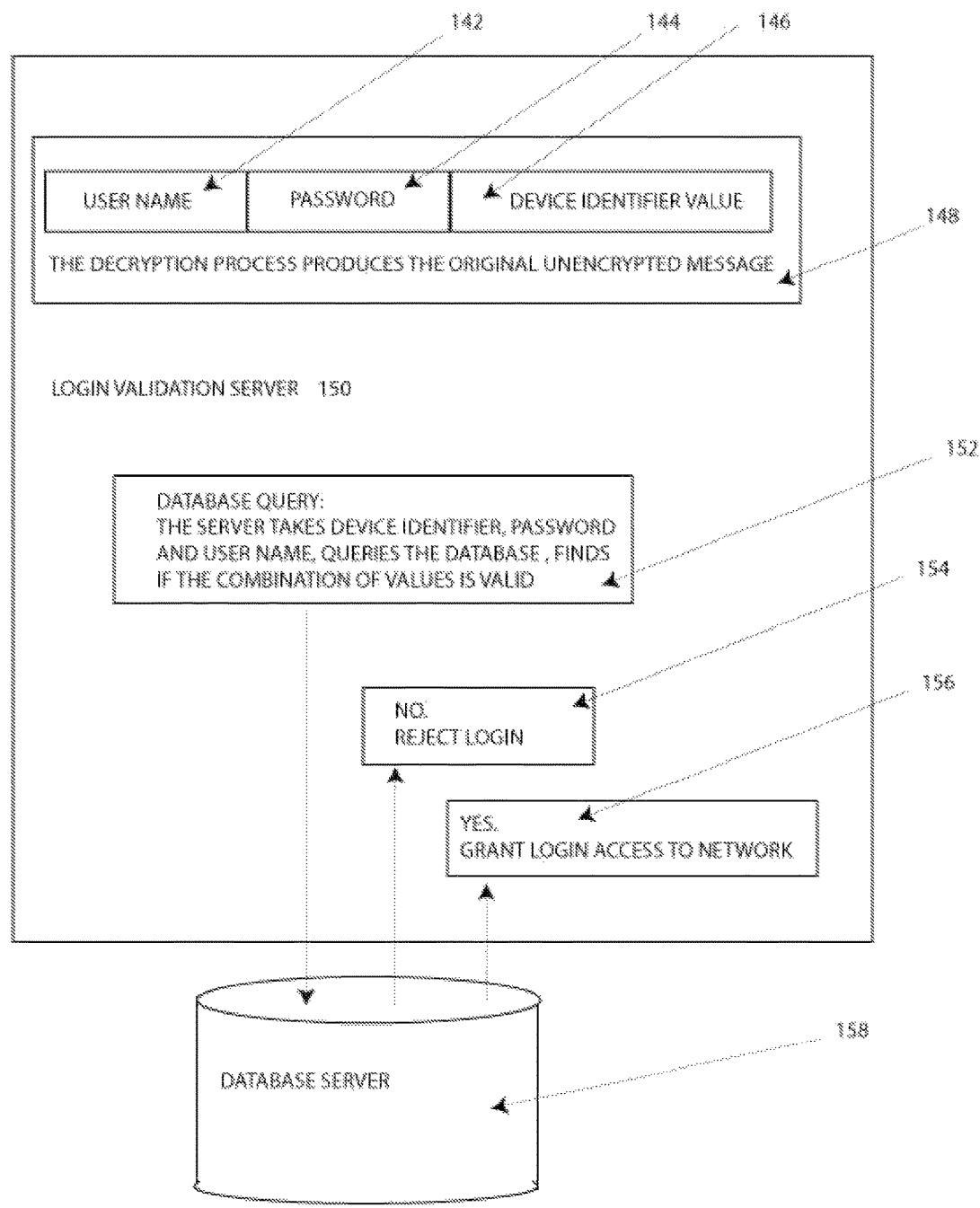
FIG. 7 shows the processing of the encrypted message sent by a client device to a login authentication server and in particular

FIG. 7 shows the processing of the encrypted message sent by a client device to a login authentication server 150. The login authentication server is able to execute software programs and it is in possession of the first key pair's private key. This private key is associated with the first public key used on the client device to encrypt a message.

A network that the signal is transmitted through may not be entirely secure. Internet or phone network communications can be intercepted and read by processes such as the "man in the middle attack". But because the signal contains a message encrypted with asymmetrical key encryption an encrypted message can only be deciphered by a machine that can execute a deciphering software process, which includes the associated first key pair private key.

Further to the above, the prospects of a "man in the middle attack" can be minimized, according to embodiments of the present invention, if the broad philosophy of ensuring that a communication device only communicates with a server when the server's identity (by way of a server identifier), the device's identity (by way of a device identifier) and an associated communication channel between the device and the server have been secured using asymmetric key encryption. Additional layers of security can be provided by way of the use of authenticated sessions (using session identifiers) operating between authenticated connections (using connection identifiers) in association with authenticated users who having authenticated passwords. Additional modes of security can also be provided by the use of manual distribution of the third private key so as to ensure that a man in the middle attack does not access unencrypted private key three as seen in FIG. 3 (there being at the time of transmission of private key number three no way to decrypt an encrypted communication by a user). Further, to the above, not only can a server be identified by its IP address and a device by its IMEI number (or other indicia), but the location of either the server or the device can be identified and authenticated using a location identifier to provide an additional layer of security.

The login authentication server 150 receives a signal from a device. The signal contains an encrypted message that is deciphered 148 by means of software programs executed by the login server. The deciphering process uses the first key pair private key, and the result of decryption is that a decrypted message containing a password 144, user name 142 and device identifier 146 are read and stored in memory by the login authentication server.

The login authentication server takes this data and sends a query 152 to a database 158 connected to the secure network in order to determine if the user name and password combination is correct. When the query is executed and the user name and password are not valid 154 a message is sent back to the client device by the login authentication server instructing the application running on that device to show the password entry screen to the user again so they can re-enter their user name and password. In the event of repeated failed attempts to log in, the login authentication server would stop communicating with the device or engage in other, appropriate responses that are determined by network administrators.

If a password and user name combination are correct 156 the user login process can move on to the next stage.

Figure 8:
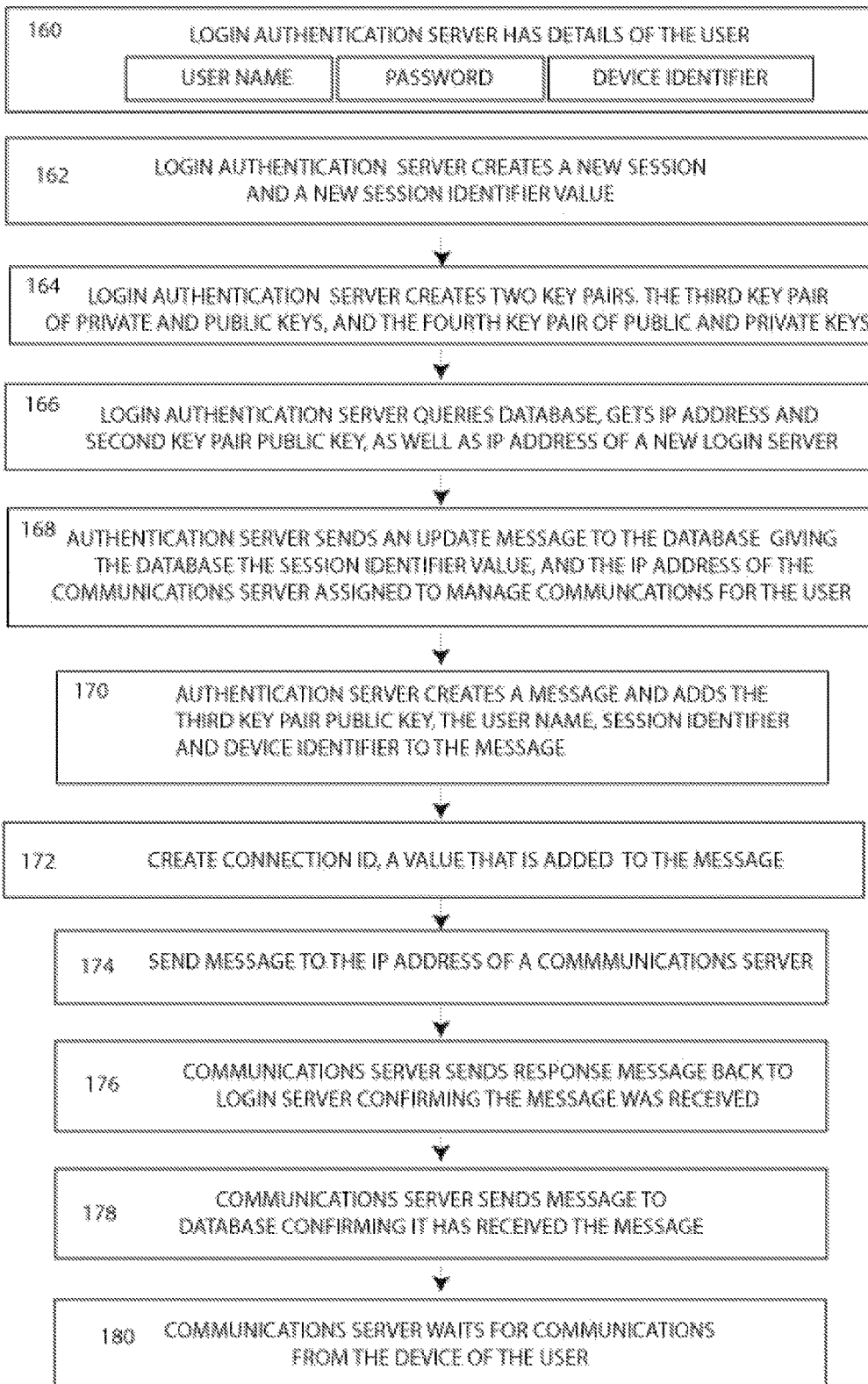
FIG. 8 shows the preparation for encrypted channels of communication between a communication device and a communications server by preparing private keys 3 and 4 for transmission to the user of the device (further checks are performed with regard to session and connection identifiers and checks on transmission only to authenticated IP addresses).

FIG. 8 shows a set of processes executed within the login authentication server in the event of a valid user login as indicated by item 156 in FIG. 7.

The login authentication server has details of the current user 160, notably the user name, password and device identifier. The login authentication server then creates a new session identifier 162 value and a new session of communications for the device and user.

The login authentication server then executes procedures to create two sets of asymmetrical keys. Key pairs known as the third key pair and fourth key pair are created 164.

The login authentication server queries a database 166 to get details of a communications server that can manage communications for the client device. The database response contains an IP address and a second key pair public key of a communications server. Additionally, another IP address for a second login authentication server is received from the database. The second login authentication server IP address can be sent to the client device so that in future communications the device can use an alternate login server to connect to the network and so as a result diminishing the traffic sent to the initial login server.

In the event of a distributed denial of service attack against a specific IP address and the specific login server listening to network traffic at that IP address, the login attempts of users with devices configured to connect to different login servers at different IP addresses are unlikely to be directly affected.

The authentication server sends an update messages 168 to the database instructing the database to update its records with changed details. The updated details are the session identifier value and the IP address of the communications server that have been designated to manage communications for a specific user and device, and the new login authentication server that has been assigned to the user.

The login authentication server creates a new message, a new container of information 170. It adds the fourth key pair public key, the user name, session identifier and device identifier to the message.

The login authentication server also adds another item to the message, a connection identifier value 172. The connection identifier value can be created at this time or it can be a stored value which is listed in a database and which is now listed to be connected with the client device.

The login authentication server then sends this message 174 to the IP address of the communications server assigned to manage affairs for the client device.

The communications server sends a response message back to the login authentication server 176 confirming that it has received the message.

The communications server sends a message to the database 178 confirming it has received the message, and instructing the database to update its data with the information that it is now going to manage communications for a specific device.

The communications server waits 180 for communications to be sent to it by the client device.

Figure 9:
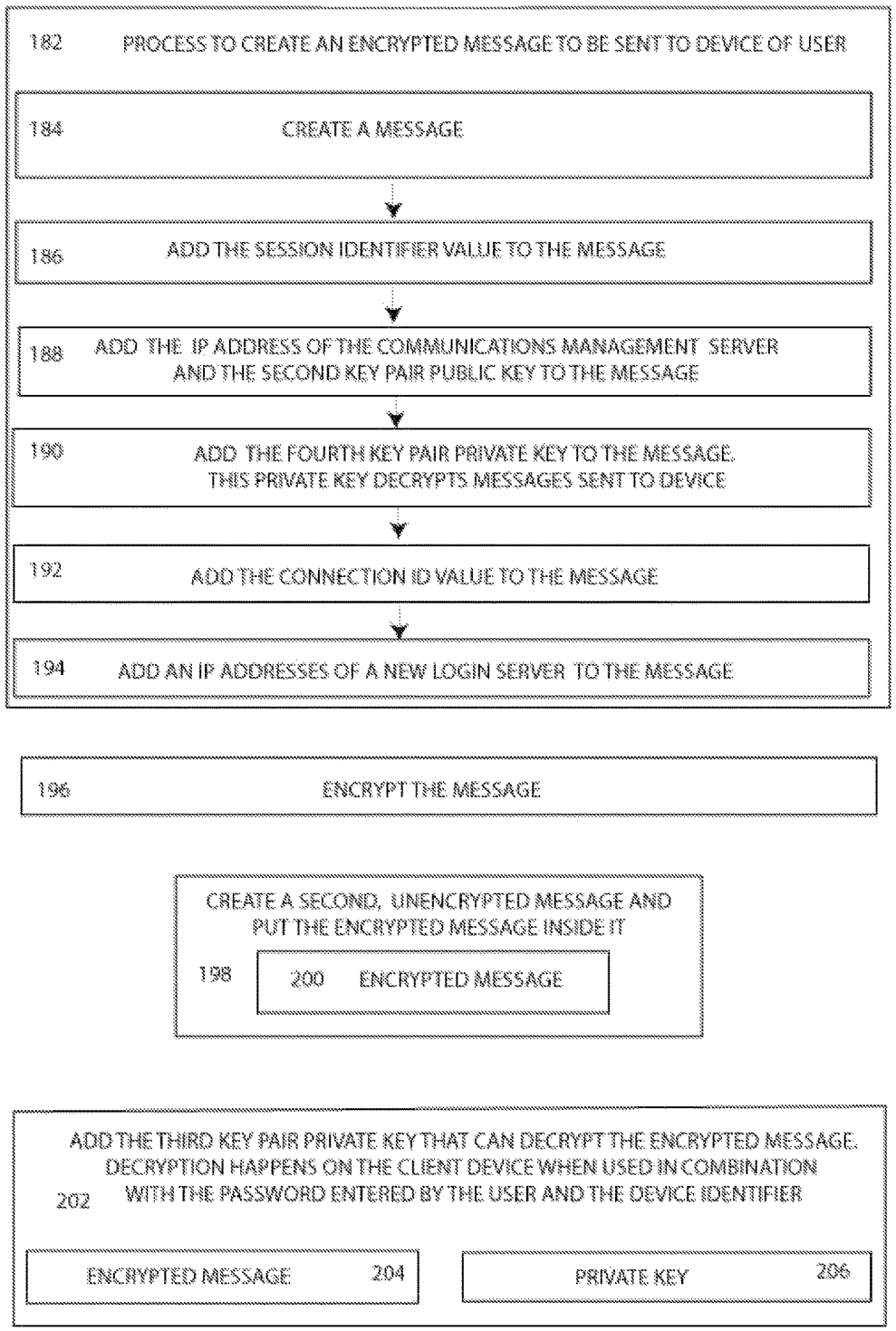
FIG. 9 shows a process executed by the login authentication server to create both an unencrypted message and encrypted messages that can be sent to the client device (the unencrypted message, containing private key 3, is used to decipher the subsequent encrypted message that contains the final key (private key 4), that is used by the user's device to decrypt all subsequent communications between the communication management server and the client (user) device).

FIG. 9 shows a process executed by the login authentication server to create both encrypted and unencrypted messages. The process in question starts at 182 for purposes of creation of an encrypted message.

To begin with, a message container is created 184 and the session identifier value is added to the message 186, along with the IP address of a communications management server 188 and the second key pair public key, a public key that can be used to encrypt messages that can be sent to the communications server. The fourth key pair private key is added 190 to the message, so that the client device can decrypt messages sent to it by the communications server. The IP address of a new login server 192 is also added 194 to the message, so that the device can connect to an alternate login authentication server.

The message is encrypted 196 using the third key pair public key.

A second message is created 198 and the encrypted message 200 is put into the second message.

The third key pair private key is added to the message 206, with the final result 202 that the final message contains the encrypted message 204 and the unencrypted private key 206.

Figure 10:
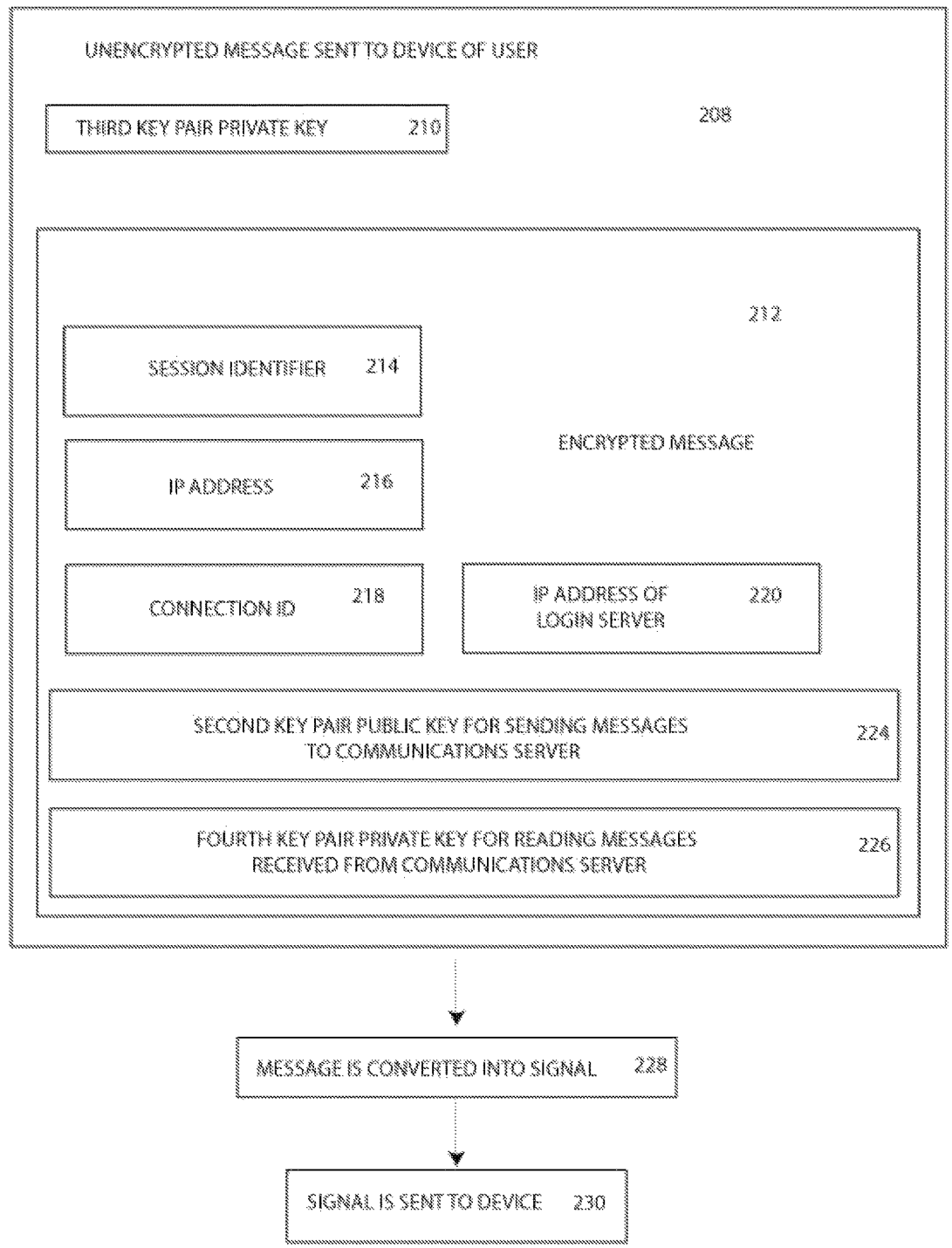
FIG. 10 discloses further details pertaining to the encrypted (private key 4) and unencrypted messages (private key 3) disclosed in FIG. 9 (in an additional embodiment private keys 3 and 4 can preferably be sent in different messages).

FIG. 10 shows the full contents of the message created in the steps shown in FIG. 9.

Within the unencrypted message that is be sent to the user 208 there is an unencrypted third key pair private key 210. There is also an encrypted object 212 that contains the session identifier 214, the IP address of a communications server 216, the connection identifier value 218, the IP address 220 of a new login authentication server, the second key pair public key 224 that is used for sending messages from a device to a communications server and the fourth key pair private key 226 that is used for deciphering messages sent by a communication server to the device.

The message containing encrypted and unencrypted data is converted into a signal by the login authentication server 228, and this signal is sent 230 to the device.

Figure 11:
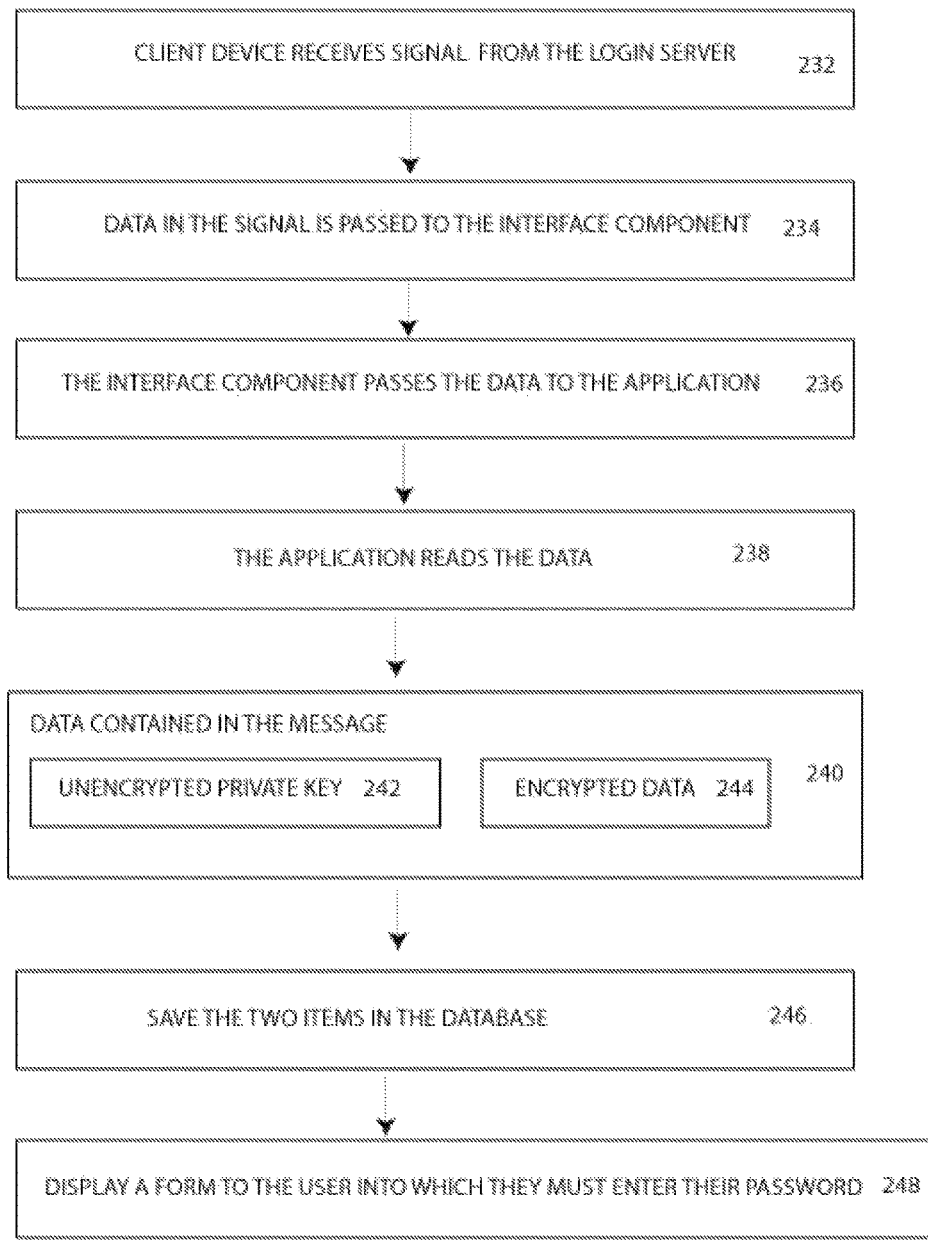
FIG. 11 discloses the processing by the client device of a message received from the login authentication server.

FIG. 11 shows processing of data received by the client device from the login authentication server.

The client device receives a signal from the login server 232 and the data in the signal is passed on 234 to the interface component. The interface component passes the data 236 to the application. The application reads the data 238 and extracts the unencrypted 242 and encrypted 244 elements within that data 240. The encrypted and unencrypted data are saved 246 in the database. The unencrypted data being the third key pair private key.

The application then displays a form visible to the user on the screen of their device 248, displaying a form into which they can enter their password for the second time.

FIG. 12 shows the final part of the user login process.

The user can enter their password 252 as text input into the form 256, then they can submit the form by clicking a "finalize" login button 254 or some similar process.

Data is passed from the device to the application via the interface component, and the application launches a process 258.

In the process 258 the password is received from the login form 262, then the user name and device identifier values are retrieved from the database 264, and the unencrypted third key pair private key sent by the login authentication server 266 is also retrieved from the database, along with the encrypted data sent by the login server. In combination with the password and device identifier, the third key pair private key is used to decrypt the encrypted data and read the contents 270.

The content of the encrypted data is the IP address of a new login authentication server 272, the connection id 274, the second key pair public key used for sending messages to the communications server 276, the IP address of the communications server 278, the session identifier value 280 and the fourth key pair private key 282 used for reading messages sent from the communications server. These values are saved in the application database 284.

Figure 13:
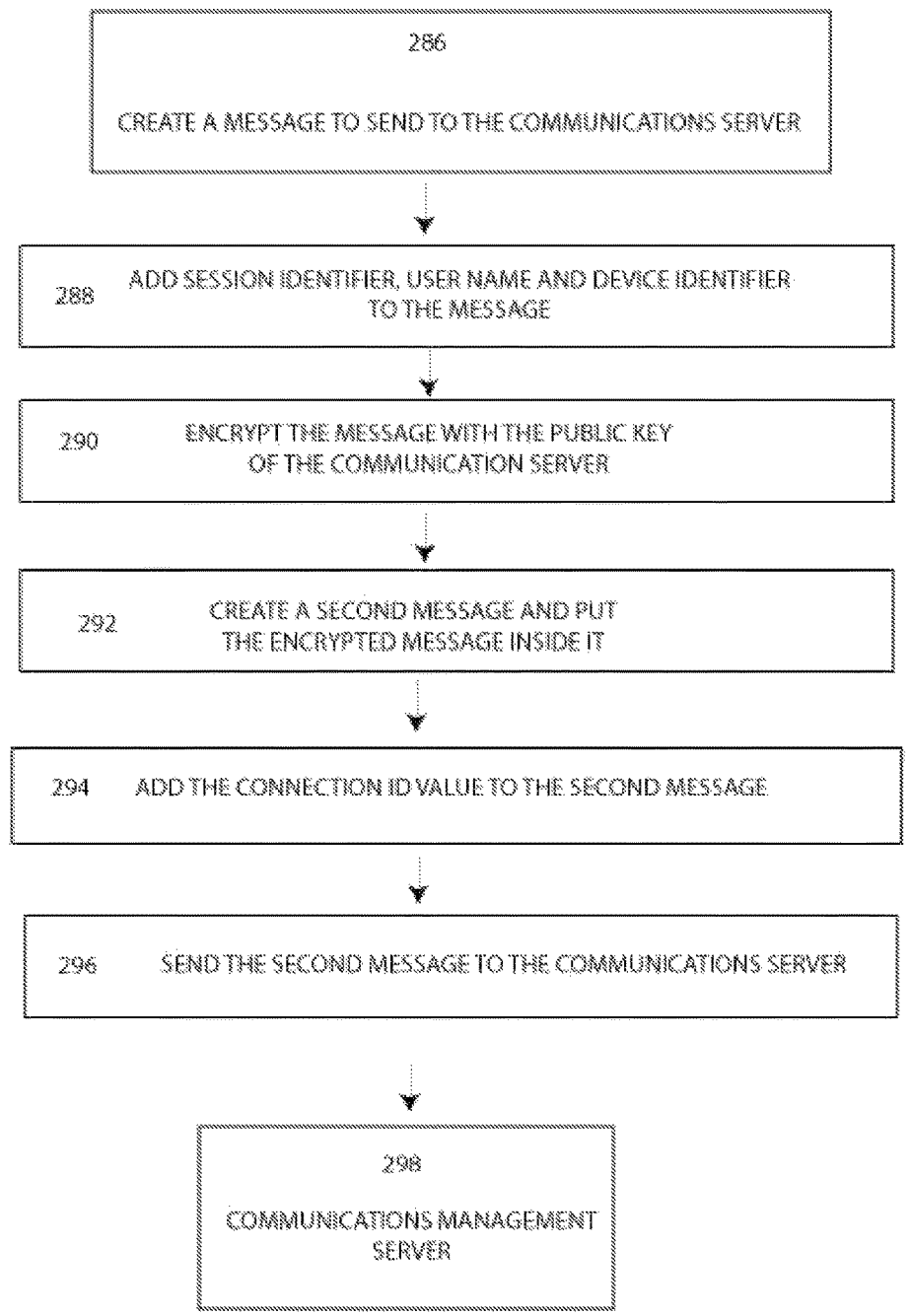
FIG. 13 shows the client communication device initiating communications with the communication management server. The communication is encrypted using a public key and a connection ID value as well as a device identifier provided for authentication purposes.

FIG. 13 shows procedures executed after data is saved in the database.

A message is created 286 that is to be sent to the communications server. The session identifier, user name, and device identifier are added to the message 288.

The message is encrypted with the second key pair public key 290.

A second message is created 292 and the encrypted message is placed inside it. The connection identifier value is put inside the message 294. The message is sent to the communications server 296.

The communications management server receives the message from the device via the network 298.

Figure 14:
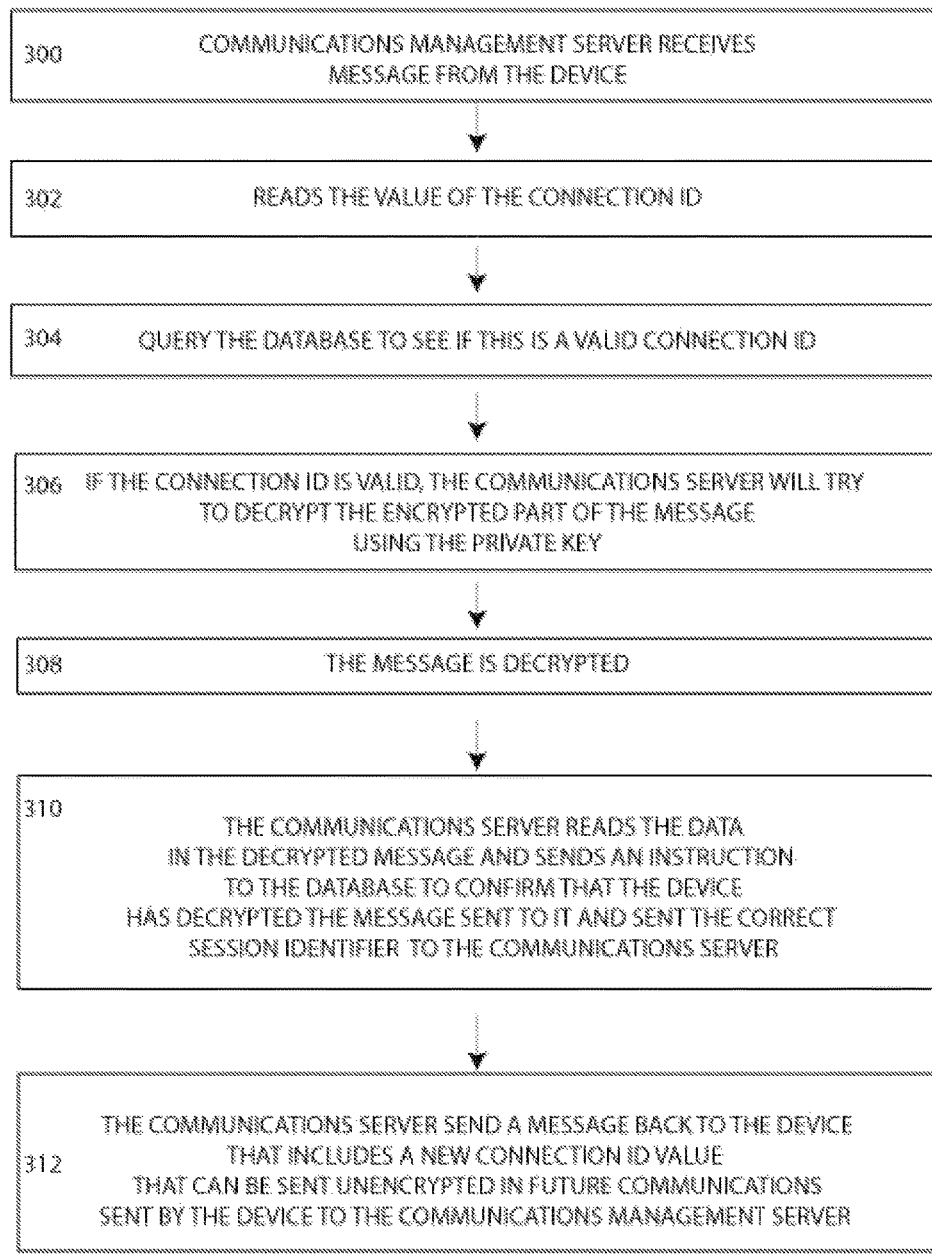
FIG. 14 shows the communication management server querying the validity of the message (authenticating the message) sent in FIG. 13 and issuing the client communication device with a new connection ID value.

FIG. 14 shows procedures executed within the communications management server when it receives the message 300 from a client device.

The communications management server reads the unencrypted connection identifier value 302. The communications management server queries the database 304 to find if this is a valid connection identifier.

If the connection is valid, the communications server can use the second key pair private key to decrypt the message 306 it has been sent by the client device.

The message is decrypted and read in the memory of the server 308 and the server executes an update query, instructing the database that the user has logged in and that their session should be persisted for an additional period of time. Normally, this extension period can be a period of three minutes but other time gaps can be used within the system depending on specific requirements within different implementations.

The communications server sends a response 310 back to the device. This response can optionally include a new connection identifier.

This connection identifier value has several functions within the system (outlined in the following paragraphs).

The communications server queries a database to see if this connection identifier is valid. If the connection identifier is invalid then the server will not attempt to decrypt the encrypted part of the message received from the device. The decryption process is a resource intensive procedure and the communications server can be programmed to reject invalid data requests that can be originating from criminals or hackers.

The second function provided by the connection identifier is that when the communications server does a database query and finds this is a valid connection identifier, the connection identifier can in fact be a shared value that two or more end user communications devices share. That is, one user John Smith can engage in an encrypted chat session with another user Tom Brown and both of them can share the same connection identifier. The communications server can be programmed to differentiate between messages sent by Tom Brown and John Smith by a simple mechanism. This mechanism is that the connection identifier value can be a value like: 9098898-03. When the server receives the message it can split the message into two parts at the dash "-" producing the two values 9098898 and 03. Both John and Tom can send the 9098898-part of the message but they can have two different end parts such as "03" and "01". So that when the communications server sends a request to the database to ask the database if the connection is valid, it can send the entire string 9098898-03 to the database and that database can say "yes" the person this value refers to has a valid login. Then the communications server can use its Private Key to decrypt the whole message sent from the client and to get instructions from within that message about the specific data the client is asking for. Then the communications server can then provide that data to the device, which can take many forms such as communicating text or files, or streaming audio or video content to that user.

After the communications management server has been configured to manage communications with a specific client device such as a mobile phone, the application on the phone can connect to the communications management server and be sent a collection of data that can be displayed on the screen for a user to see. The user can see icons or lists of items that the user can interact with via the installed application. There are many kinds of items that can be made available to the user, including encrypted documents that can be downloaded via the communications management server, or channels the user can choose to access in order to engage in encrypted voice or video communications.

Within a system that operates according to the system described herein, the problem arises, that data viewable on the device must be secured so that only an authorised user can view data sourced by the device from a communications management server. In the process described thus far, according to one embodiment, a secure session of communications is established and that session can persist indefinitely. Therefore, if a phone were stolen by a thief then the thief could launch the application and view or download encrypted files or other encrypted content. In response to this security threat, a timeout for the session can be imposed and as a result, the session can expire and the user can terminate the encrypted communications after a short period of inactivity. For instance, within this system a communications server can be programmed to stop communicating with a device after three minutes of inactivity by the user. Further to the above, manual audits (checks) upon certificates issued to users can be implemented to cancel suspicious security certificates and to terminate access by users whose authentication appears questionable. Further, to the above, additional levels of security can also be added to the system in the form of biometric authentication and device specific, including IMEI numbers, to further strengthen the process of authentication.

One method of resuming communications would involve the user re-entering their password.

After a timeout has occurred, the user of the application running on the client device can attempt to communicate with the communications management server. For example the user can click on a button visible on a mobile phone interface and attempt to access an encrypted file. But if a logged out user attempts to access an encrypted file, when the communications server receives an encrypted message from the device containing a request to get the encrypted file, the communications server can then first query a database and receive a response informing the server that the communications session for this user has expired. The communications management server would then send a message back to the application running on the client device instructing the application to reconnect with the login authentication server. The mobile device or client computer can be directed to send a request to commence a new session of communication.

The application executing encoded instructions within a mobile phone or other device receives the instruction that the user must log in again with a password. The application creates a message containing the user name and device identifier value, and this message is encrypted using the first key pair public key. The application then creates a second message and includes the encrypted message within the second message. Then the application adds the connection identifier value to that message.

Figure 15:
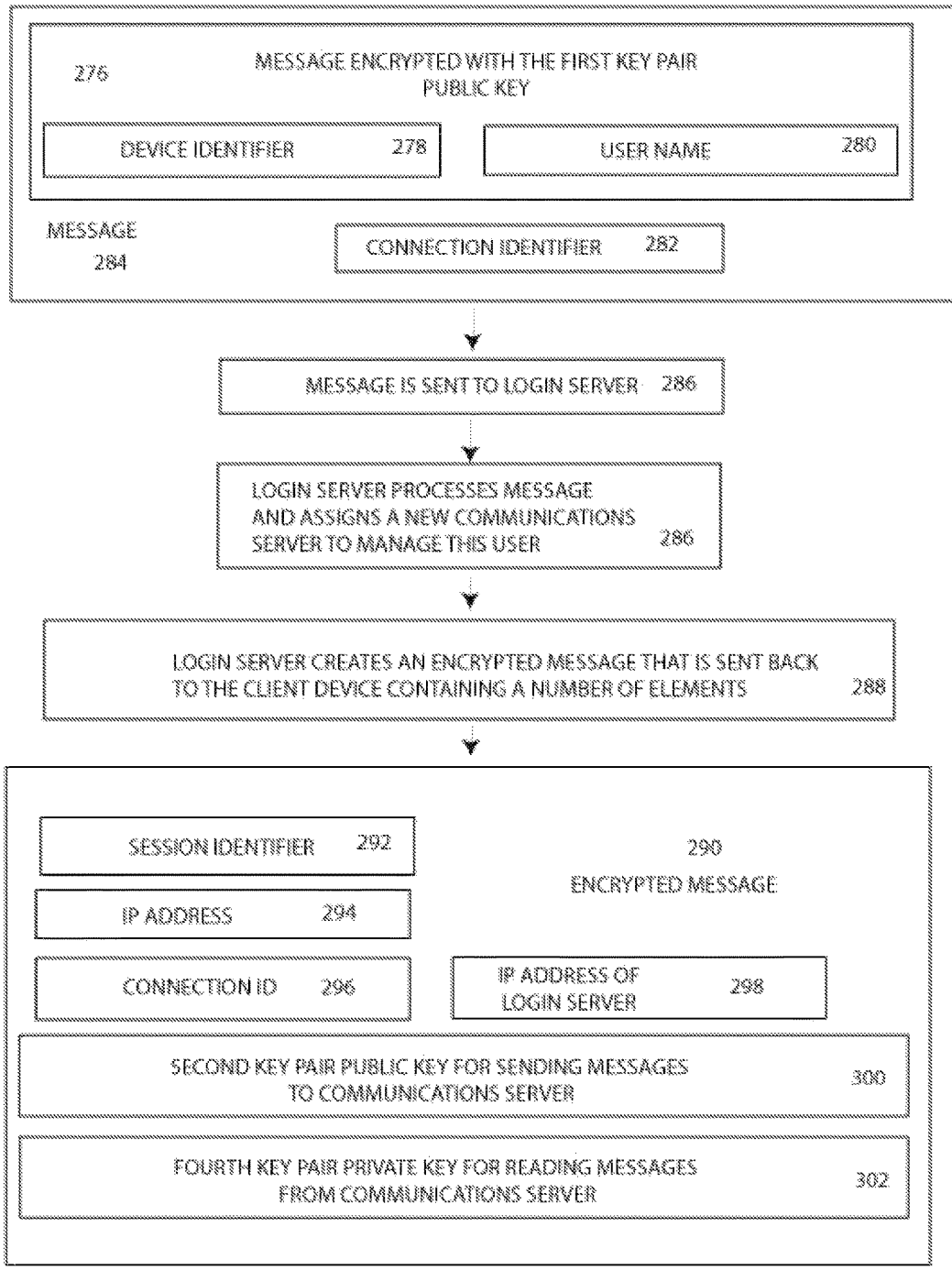
FIG. 15 shows the final messages sent from the client device and the login authentication server to each other, prior to opening up communications. In particular the device identifier, connection identifier and user name are sent to the login server by the client and in return the client's communication device receives in return a session identifier (multiple sessions per connection can be permitted) an IP address (identifying location of the server) and a second public key for the user to encrypt messages together with a fourth private key for the user to decrypt messages from the communication server.

FIG. 15 shows the encrypted message sent to the login server. The message 284 contains the connection identifier 282 and the encrypted message (276) that contains the user name 280 and device identifier value 278.

As further displayed in FIG. 15, the login authentication server returns a block of encrypted data 290 containing the following items: A new session identifier value 292; the connection identifier 296; the IP address of a communications server 294; the fourth key pair private key for decrypting messages sent from the communications management server, 302; the second key pair public key for encrypting messages sent to the communications server 300; the IP address of a new login authentication server 298.

The device receives this data and passes it to the application via an interface component. The application running on the device processes the data it receives and then displays a user interface shown to the user. The user is required to enter a password in a data entry field. When the correct password is entered via the interface the application takes this input and uses the password in combination with the device identifier stored within the application and the user name. The application then decrypts the block of encrypted data revealing the six items of information that the encrypted data contains. The application saves those six items in a database or file, overwriting the old items associated with a previous session of communications.

The application immediately sends an encrypted message to the new communications management server. This encrypted message contains the user name, device identifier, and the new session identifier value.

Connected to this process happening on the device, the login authentication server can also send a message to a new communications management server. This message contains the following items: A new session identifier value; the user identifier value of a specific user; the device identifier; the connection identifier; the third key pair public key for encrypting messages sent by the communications server to the device.

After receiving this data the new communications management server can engage in encrypted communications with the specified device.

This completes the description of one method of resuming a session of communications.

A second method of extending a session of communications will now be described.

When a user has established an active session of communications by entering a password, a user can engage in different types of interaction with the application.

One procedure can be a procedure for the purpose of creating an alternative method of logging in and user authentication.

One type of interaction that can facilitate a login can involve a user touching a touchscreen interface on a mobile phone, tablet or similar device and recording a series of swipe movements created by the user on the touchscreen (the movements being recorded in the system and used as a type of password).

Figure 16:
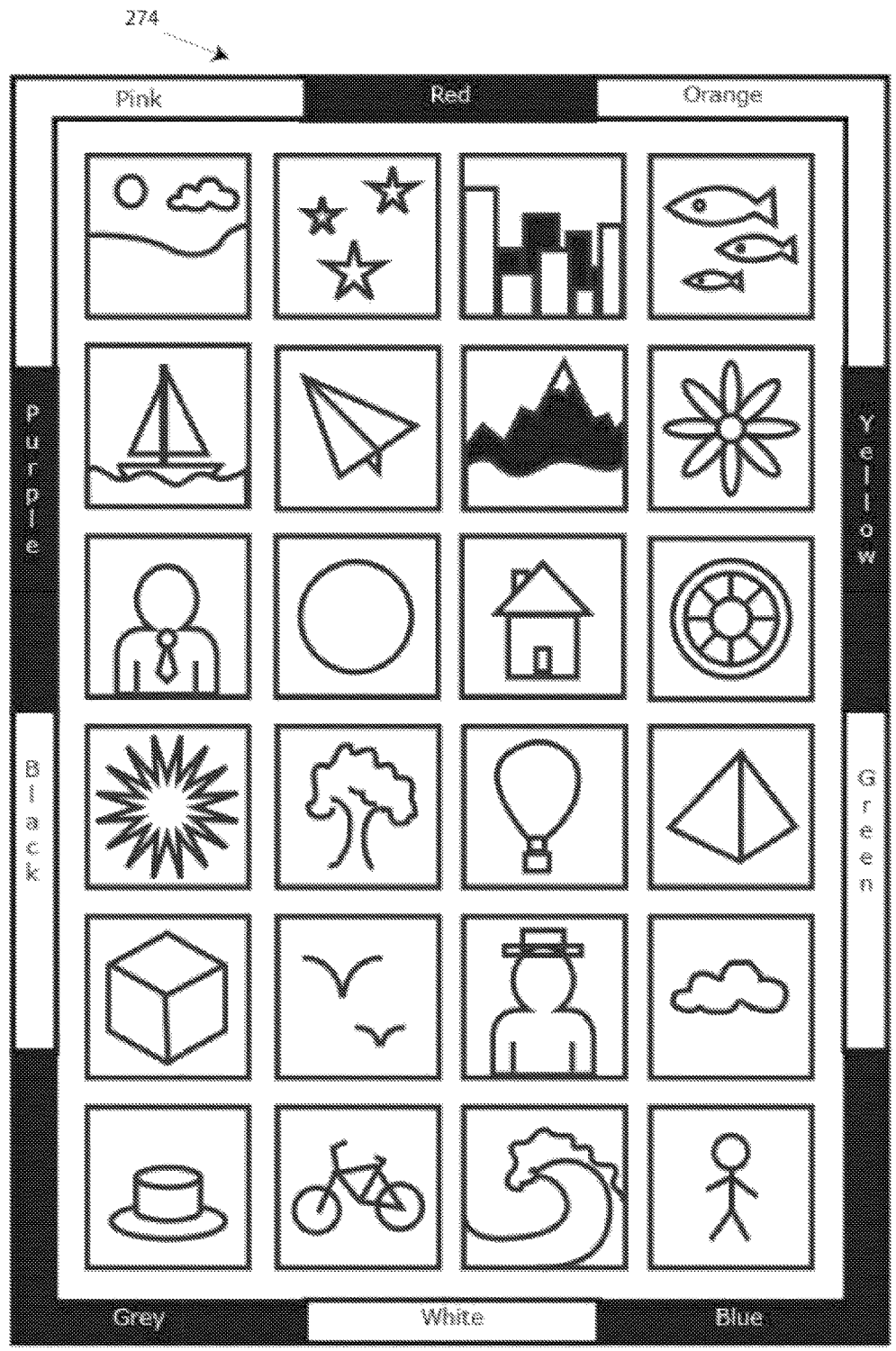
FIG. 16 shows a touch screen display that features a plurality of images and colours that can be used for creation of a randomised password for use in association with embodiments of the present invention.

FIG. 16 shows a login display screen that can be used in association with embodiments of the present invention. In one embodiment of the present method of using a touchscreen, a number of images of objects and blocks of colour can be arranged in a grid on a screen, as in FIG. 16, and a user can drag an object from one location and drop it in a different location.

If a set of pictures as seen in FIG. 16 were shown on a screen, including a picture of a bicycle and a picture of a circle, and if there were blocks of colour on the screen including blocks of red and white, a user can interact with the touchscreen and create a series of movements that can be described in the following way: Circle-Red-Bicycle-White. A sequence of movements that can be recorded as "Circle-Red-Bicycle-White" can involve a user touching an image of a circle and dragging it across the screen to a position where it is on top of a block of red colour, lifting the user's finger away from the screen, then touching the image of a bicycle and dragging the finger across the screen to a block of white colour, then finally lifting a finger away from the screen.

A user can generate a sequence of data of the type "Circle-Red-Bicycle-White" and this data can then be sent to the communications management server where it can be saved as what can be called a swipe pattern password login method. This swipe input data for the swipe method password is never saved on the device itself by the installed application, just as a text password is never saved by the application. The swipe input data can be sent as an encrypted message to the communications management server and that server can send an instruction to the database instructing the database to update the details of the current user with the details that the specified user has entered, being the specific swipe input data "Circle-Red-Bicycle-White".

A timeout can also occur, in which the session of communications expires. After the communication session has expired the application within the device can be programmed to display a grid of images and blocks of colour to the user. This can be the same or similar to the grid the user interacted with when creating and saving their sequence of swipe movements "Circle-Red-Bicycle-White". The user can then enter the proper sequence of movements, "Circle-Red-Bicycle-White" and this sequence can be converted into data that is encrypted and sent as a signal to the communications management server, along with the device identifier value, the session identifier value, and the user identifier value of the current user.

The communications management server can receive the encrypted data, decrypt the data, read the data "Circle-Red-Bicycle-White", query the database, and find that this data is the correct swipe input data for the user. The communications management server can then update the database with a query that extends the expiry time of the communications session of the client device and as a result persisting (continuing) the current session and allowing the user to continue to access secure resources.

A further extension of this swipe password method can be implemented, as will now be described. If pictures such as a bicycle, a circle, stars, a fish and so on, are randomly ordered in an array and sent to a communications device (and an associated password application), then the images can be laid out in an arrangement such that the stars, are second in the array (from the top left) the fish, fourth in the array from the top left and so on as seen in FIG. 16.

Then, if a person was to record a swipe password in the form "Stars-Red-Fish-Orange", this sequence can then also be described as "2-Red-4-Orange". Additionally, if the colours were identified by their position from the top left corner when going in a clockwise direction, then the Pink area could be described as 0, Red as 1, Orange as 2, Yellow as 3 and so forth. Using this type of notation the sequence "2-Red-4-Orange" can also be described as "2-1-4-2". Through this process the device can generate the password pattern "2-1-4-2" and send that to the login authentication server, and then the login authentication server that sent out the original randomly ordered array can determine that the user entered the pattern "Stars-Red-Fish-Orange" in a swipe movement sequence.

Through this method of creating the password pattern "2-1-4-2", the user can enter a different swipe pattern each time they enter their password pattern that includes the Stars and Fish images. Or to state the result in a different way, the user can enter a different password each time they use this swipe method. Further to the above, the location of the colours can also be randomised in a further embodiment, thereby increasing the complexity of passwords generated.

Each time the user re-enters their swipe gesture they can enter a different sequence of moves, since the images will be rearranged in different random positions within the grid of twenty four images by the server when the server creates the random image order sequence and sends that to the device. In other words, each time the user enters a password they can enter a different swipe movement, or what can be called a Random Swipe Pattern Password.

The entire encrypted login process can require that a user must enter a strong password as a text string that is entered once a day. But if a user has used an application several minutes earlier and the session has timed out then the swipe method can be used to quickly restart the session.

The swipe method, then, is a method of extending an active session.

This completes the description of a second method of resuming a session of communications.

A method by which a new user can join and use a service that utilizes this encrypted login process will now be described.

A new user downloads and installs an application on a client device. When the new user launches the application on the touchscreen of their mobile device, or on a screen of another kind of client computer, the user can see a form in which they can enter a user name and password.

The user can then enter a user name, for example their existing email address or mobile phone number. They can also enter a password. Then they click a "Join" button to submit this data for processing.

If the user has not entered a sufficiently strong password the application running on the client device can alert the user that they must choose another password (a suitably complex password) and again click the "Join" button.

If the user has entered a strong password then the application running on the client device can execute a process that takes the user name entered by a user and stores that data in a database or file. The installed application also executes a process to create a message and the new user's password is included in that message, along with the user name. Other details of information are also included within the message, including in one embodiment, the device identifier. After the message containing the password and other details are created and populated with data, the installed application software can encrypt the message using the first key pair public key provided by a login validation server and create an encrypted message.

The installed application can execute encoded instructions that send the encrypted message to the device via the interface component and the device can create a signal that is sent through a network to the IP address or URL of a login validation server.

The login validation server can receive a signal from a device. The signal can contain an encrypted message that is deciphered by means of software programs executed by the server. The deciphering process uses the server's private key, and the result of decryption is that the original unencrypted message contains a password, user name and device identifier can then be read into computer memory by the login authentication server.

The login validation server can then take this data and queries a database connected to the network to determine if any other current user of the service is using the user name. If there is no other current user with that user name a process can be completed through which a new user account is added to the secure network.

The login validation server can then execute processes that are identical to the procedures described earlier (in FIG. 8 and later FIG.s) in regards to the establishment of a new session of communications.

A communications server can be supplied with information so that it can manage communications for a specific user. And the device of the user can be sent data that enables the user to log in and access resources via the communications server.

Copyright in respect of drawings associated with this application remains the property of NOWWW.US Pty Ltd ACN 137 333 709 and its assigns.

What is claimed is:

1. A method of establishing secure communication with a device, the method comprising:
   receiving, on an authentication server, a login request message from the device;
   retrieving, by the authentication server, a server address and a server public key of a communication server;
   retrieving, by the authentication server, a device key pair including device public and private keys;
   transmitting a server mediation message from the authentication server to the communication server, the server mediation message including the device public key; and
   transmitting a device mediation message from the authentication server to the device, the device mediation message including the server address, the server public key, and the device private key, receipt of the device mediation message thereby enabling the device to establish a communication link with the communication server,
   wherein the device establishes the communication link by transmitting a session authentication message including a connection identifier and a secure submessage, the secure submessage containing a session identifier, the secure submessage encrypted with the server public key, such that the communication server, upon authentication of the connection identifier of the session authentication message, decrypts the secure submessage to authenticate the session identifier,
   wherein messages from the device to the communication server over the communication link are encrypted with the server public key and decrypted with a server private key, and
   wherein messages from the communication server to the device over the communication link are encrypted with the device public key and decrypted with the device private key.

2. The method of claim 1, wherein the login request message includes a username and password, the login request message is encrypted with a login public key, and the server mediation message further includes the username, the method further comprising:
   decrypting the login request message with a login private key; and
   authenticating, by the authentication server, the username and the password.

3. The method of claim 1, wherein the server mediation message further includes a username, and the session identifier is authenticated based on the username.

4. The method of claim 1, further comprising generating, by the authentication server, the connection and session identifiers,
   wherein the device mediation message further includes the connection and session identifiers, and the server mediation message further includes the connection and session identifiers.

5. The method of claim 1, further comprising:
   generating a mediation public key; and
   encrypting the device mediation message with the mediation public key.

6. The method of claim 5, wherein:
   the login request message includes a device identifier, and
   the mediation public key is generated in association with a password and the device identifier, such that a decryption of the device mediation message includes retrieving the password and the device identifier.

7. A method of establishing secure communication with a communication server, the method comprising:
   transmitting a login request message from a device to an authentication server;
   receiving, on the device, a device mediation message from the authentication server, the device mediation message including a server address, a server public key, and a device private key, the device private key retrieved by the authentication server responsive to the login request message;
   establishing a communication link between the device and a communication server at the received server address by:
      encrypting a secure submessage with the server public key, the secure submessage including a session identifier, and
      transmitting a session authentication message to the communication server, the session authentication message including the secure submessage and a connection identifier, such that the communication server, upon authentication of the connection identifier of the session authentication message, decrypts the secure submessage to authenticate the session identifier;

encrypting at least one device message with the server public key;

transmitting the encrypted device message from the device to the communication server for decryption with a server private key paired to the server public key;

receiving, on the device, at least one server message from the communication server, the server message encrypted with a device public key paired to the device private key; and decrypting the server message with the device private key.

8. The method of claim 7, wherein the login request message includes a username and password, the method further comprising encrypting the login request message with a login public key.

9. The method of claim 7, wherein the device mediation message further includes the connection and session identifiers.

10. The method of claim 7, wherein the device mediation message is encrypted with a mediation public key, the method further comprising decrypting the device mediation message.

11. The method of claim 10, wherein:

the login request message includes a device identifier, and the mediation public key is generated in association with a password and the device identifier, the device mediation message being thereby decrypted based on the password and the device identifier.

12. A non-transitory computer readable medium storing executable program instructions which, when executed on at least one processor, cause an authentication server to perform operations responsive to receipt of a login request message from a device, the performed operations comprising:

retrieving a server address and a server public key of a communication server;

retrieving a device key pair including device public and private keys;

transmitting a server mediation message to the communication server, the server mediation message including the device public key; and transmitting a device mediation message to the device, the device mediation message including the server address, the server public key, and the device private key, receipt of the device mediation message thereby enabling the device to establish a communication link with the communication server, wherein the device establishes the communication link by transmitting a session authentication message including a connection identifier and a secure submessage, the secure submessage containing a session identifier, the secure submessage encrypted with the server public key, such that the communication server, upon authentication of the connection identifier of the session authentication message, decrypts the secure submessage to authenticate the session identifier, wherein messages from the device to the communication server over the communication link are encrypted with the server public key and decrypted with a server private key, and wherein messages from the communication server to the device over the communication link are encrypted with the device public key and decrypted with the device private key.

13. The non-transitory computer readable medium of claim 12, wherein the login request message includes a username and password, the login request message is encrypted with a login public key, the server mediation message further includes the username, and the performed operations further comprise:

decrypting the login request message with a login private key; and authenticating the username and the password.

14. The non-transitory computer readable medium of claim 12, wherein the server mediation message further includes a username, and the session identifier is authenticated based on the username.

15. The non-transitory computer readable medium of claim 12, wherein the performed operations further comprise generating the connection and session identifiers, the device mediation message further includes the connection and session identifiers, and the server mediation message further includes the connection and session identifiers.

16. The non-transitory computer readable medium of claim 12, wherein the performed operations further include:

generating a mediation public key, and encrypting the device mediation message with the mediation public key.

17. The non-transitory computer readable medium of claim 16, wherein:

the login request message includes a device identifier, and the mediation public key is generated in association with a password and the device identifier, such that a decryption of the device mediation message includes retrieving the password and the device identifier.

* * * * *